April 24, 1951     W. G. FRENZEL     2,549,900
DUMP BODY LIFT
Filed March 25, 1948
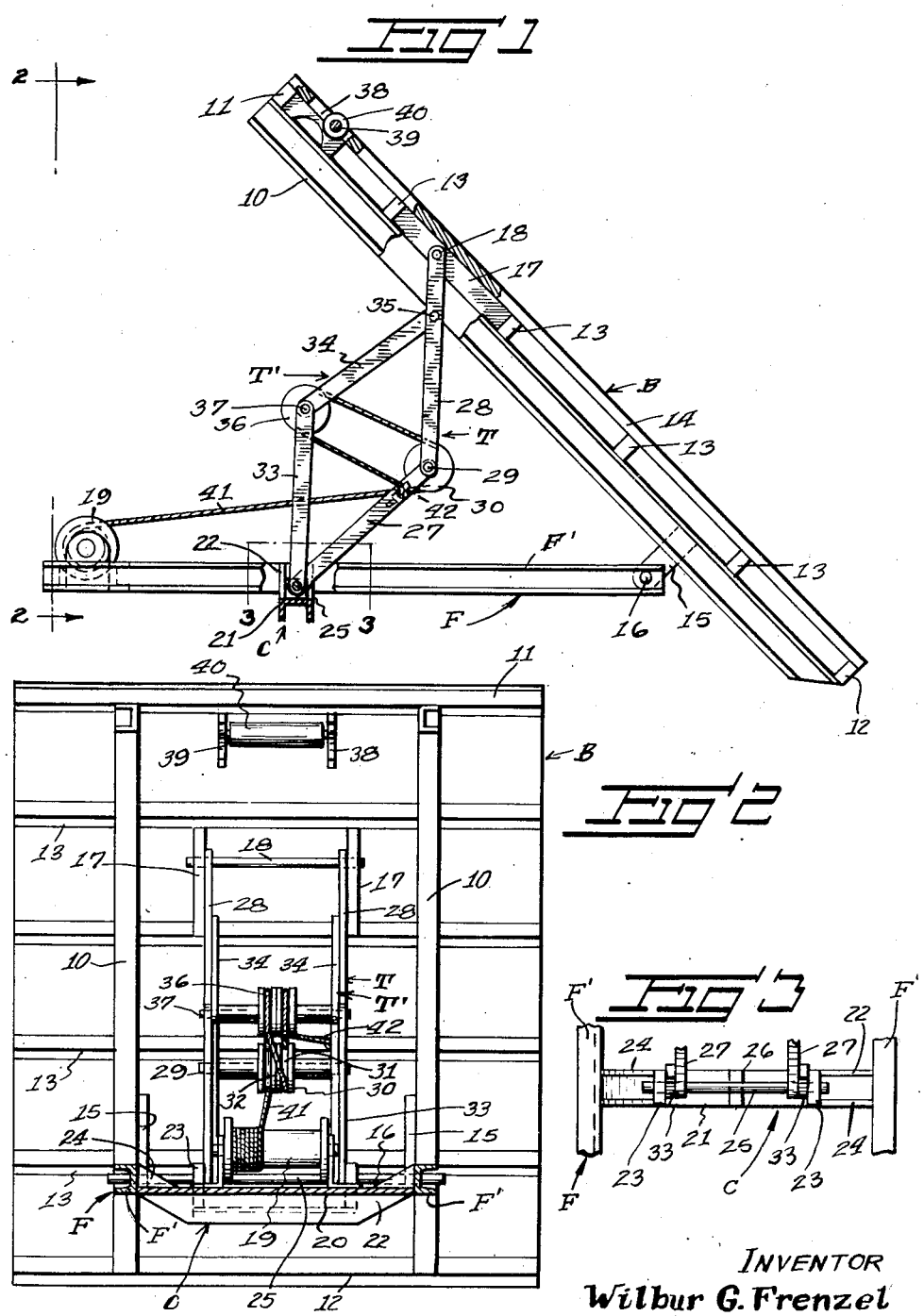
INVENTOR
Wilbur G. Frenzel
By Wilfred E. Lawson
ATTORNEY

UNITED STATES PATENT OFFICE 2,549,900

DUMP BODY LIFT

Wilbur George Frenzel, Nome, Tex.

Application March 25, 1948, Serial No. 17,081

1 Claim. (Cl. 298—19)

My invention relates to vehicle bodies and more particularly to dump beds for trucks.

The object of my invention is to provide a truck dump bed secured pivotally adjacent its rear end to the frame of the truck, which supports a winch adapted to pivot the bed into dumping or unloading position and to return it into horizontal or load supporting position.

Another object of my invention is to provide a truck dump bed of the character indicated above equipped on its under side intermediate its ends with a pair of cooperating toggle joints, one end of each of which is pivotally secured to the truck frame, and which are adapted to be actuated by the winch to raise and lower the front end of the bed.

Other objects of my invention may appear in the following specification describing my invention with reference to the accompanying drawing illustrating a preferred embodiment of my invention. It is however to be understood, that my invention is not limited or restricted to the exact construction and combination of parts described in the specification and shown in the drawing, but that such changes and modifications may be made, which fall within the scope of the claim appended hereto.

In the several figures of the drawing, similar parts are designated by similar reference characters and Figure 1 is a view in side elevation of a dump truck bed structure constructed in accordance with the present invention, parts being in section.

Figure 2 is a view looking toward the rear of the structure from the plane of the line 2—2 on Figure 1.

Figure 3 is a fragmentary detail.

The truck dump bed forming the subject matter of my invention comprises a bed frame B consisting of two side sills 10, on the front and rear ends of which end sills 11 and 12 respectively are secured and extend transversely to said side sills. Intermediate the front and the rear sills a plurality of cross members 13 are fastened on top of the side sills 10. A stringer 14 extends longitudinally of the bed frame B adjacent each side thereof and is securely mounted on top of the cross members 13. A dump body of any preferred construction not shown, is mounted in any desired manner on this bed B. At a distance in front of the rearmost cross member 13 a rigid hinge member 15 is secured to each side sill 10 for instance by welding and extends downwardly beyond the corresponding side sill. By means of a hinge pin 16 extending through the lower portions of the rigid hinge members and through both longitudinal side members F' of a truck frame F, the bed frame B is pivotally mounted on the rear end of said truck frame F, which may be of any preferred conventional construction, and the rear end of the bed frame extends rearwardly beyond the truck frame.

A pair of longitudinal frame members 17 extends between and are secured to two cross members 13 located in the front portion of the bed frame B, and a transverse pivot shaft 18 is rigidly mounted in and supported by said longitudinal frame members 17 for a purpose to be described later.

Adjacent the front end of the truck frame and centrally located therein a winch 19 of any conventional preferred construction is mounted on a transverse support structure 20 provided in the truck frame F.

Rearwardly of this structure a cradle C is arranged consisting of a channel having a horizontal middle portion 21 and slightly upward extending end portions 22. The cradle extends transversely between and is welded onto the truck frame members F'. Two supports 23 are welded onto the outer end portions of the middle cradle portion and extend upwardly therefrom. These supports are reinforced by two braces 24 extending between and welded onto the supports 23 and the truck frame members F'. A second pivot shaft 25 extends through the supports 23 and a brace 26 is welded onto the middle cradle portion intermediate the supports 23 and extends upwardly from said portion to engage and reinforce the pivot shaft 25.

At each side of the longitudinal center line of the truck frame F a lifting lever 27 is pivotally mounted on the second pivot shaft, so that these lifting levers are spaced equal distances from said center line.

Another pair of lifting levers 28 is pivotally mounted on the first mentioned pivot shaft 18 supported by the longitudinal bed frame members 17, and these lifting levers 28 are arranged, so that the free end portion of each of them is located adjacent the free end portion of one of the first named lifting levers 27. The adjacent end portions are then pivotally connected with each other by means of a pivot pin 29 extending through all four lifting levers and forming a toggle T out of each adjacent pair of levers. A double grooved pulley 30 provided with two cable grooves 31 and 32 respectively is rotatably mounted on the pivot pin 29 between the two toggles T.

A third pair of lifting levers 33 is pivotally mounted on the second transverse pivot shaft 25 outside the two first mentioned lifting levers 27, and a fourth pair of lifting levers 34 is pivotally mounted on a third transverse pivot shaft 35 extending between the secondly named lifting levers 28 at a distance below the pivot shaft 18. A pivot pin 37 extends through the free end portions of the four lifting levers 33 and 34, so that the adjacent levers form a toggle T'. The toggles T are constructed so that their apexes extend rearwardly and the toggles T' are constructed so that their apexes point forwardly. A double grooved pulley 36 is rotatably mounted on the pivot pin 37 between the lifting levers forming the toggles T'.

Two brackets 38 may be secured to the front end portion of the dump bed frame B at equal distances from the longitudinal center line of said bed frame and depend downwardly from said end sill. In each bracket 38 a bearing 39 is arranged, and a roller 40 is rotatably supported by these bearings.

A cable 41 is secured to the winch 19, extends rearwardly therefrom and is trained over the grooved pulley 30. Then it extends forwardly over one of the grooves of the doubly grooved pulley 36. The free end of the cable is fastened by means of a U-bolt 42 to the outside surface of the lifting lever 27. When the winch is set in motion and the cable 41 is wound onto the winch the two pulleys 30 and 36 are urged toward each other, so that the toggles T and T' lift the forward end of the bed frame B into dumping or unloading position. When the winch is rotated in a direction to unwind the cable 41 the dump bed returns by gravity into horizontal or idle position.

When the winch is to be used for the purpose of lifting bales or the like a cable (not shown) may be trained from the winch over the roller 40 mounted on the front portion of the bed B.

I claim:

A structure of the character described, comprising a truck frame, a dump bed in the form of a flat body supporting structure overlying the frame, a pivot coupling between said structure and the frame for vertical oscillation of the structure, said truck frame comprising a pair of spaced parallel beams, a cradle structure disposed transversely between and connected with said beams, a first set of toggles coupled between said cradle and the body supporting structure, said toggles comprising two lifting levers each pivotally connected at one end to said cradle and two lifting levers each pivotally connected at one end to said supporting structure, a transverse pivot shaft forming a coupling between the other ends of the first mentioned levers and the other ends of the second mentioned levers, a second set of toggles comprising two lifting levers each pivotally connected at one end to said cradle and two lifting levers each pivotally connected at one end to one of those lifting levers of the first toggle set which is connected to the supporting structure, the connection of the said two lifting levers of the second set to the last mentioned levers of the first set being below the connections of the said last mentioned levers of the first set with the supporting structure, a second transverse pivot shaft forming a coupling between the other ends of the first mentioned levers of the second set and the other ends of the second mentioned levers of the second set, pulleys rotably supported on each of the shafts, a cable passing around and connecting said pulleys, one end of said cable being secured to a lever, and means on the truck frame for connection with the other end of the cable for pulling the latter to effect the actuation of the two sets of toggles.

WILBUR GEORGE FRENZEL.

REFERENCES CITED

The following references are of record in the file of this patent:

UNITED STATES PATENTS

| Number | Name | Date |
|---|---|---|
| 463,254 | Pay | Nov. 17, 1891 |
| 1,000,622 | Pay | Aug. 15, 1911 |
| 1,237,323 | Gervais | Aug. 21, 1917 |
| 1,552,281 | Edwards | Sept. 1, 1925 |
| 2,034,306 | Lowdermilk | Mar. 17, 1936 |
| 2,140,421 | Fageol | Dec. 13, 1938 |
| 2,312,871 | Brick | Mar. 2, 1943 |
| 2,425,953 | Rogers | Aug. 19, 1947 |